United States Patent
Davila, Jr.

[11] Patent Number: 5,903,448
[45] Date of Patent: May 11, 1999

[54] FOUR QUADRANT FLYBACK CONVERTER, METHOD OF OPERATION THEREOF AND POWER PLANT EMPLOYING THE SAME

[75] Inventor: Marco Antonio Davila, Jr., Mesquite, Tex.

[73] Assignee: Lucent Technologies Inc., Murray Hill, N.J.

[21] Appl. No.: 08/915,442

[22] Filed: Aug. 20, 1997

[51] Int. Cl.[6] .......................... H02M 3/335; H02M 1/12; H02M 7/538

[52] U.S. Cl. .................... 363/24; 363/25; 363/26; 363/133; 363/41

[58] Field of Search .................. 363/24, 25, 26, 363/133, 41

[56] References Cited

U.S. PATENT DOCUMENTS

| | | | |
|---|---|---|---|
| 4,559,590 | 12/1985 | Davidson | 363/133 |
| 4,823,249 | 4/1989 | Garcia, II | 363/24 |
| 4,866,587 | 9/1989 | Wadlington | 363/16 |
| 4,897,522 | 1/1990 | Bilczo et al. | 363/26 |
| 5,177,675 | 1/1993 | Archer | 363/25 |
| 5,349,157 | 9/1994 | Blankenship | 363/26 |
| 5,646,832 | 7/1997 | Pulhamus, Jr. et al. | 363/24 |
| 5,654,881 | 8/1997 | Albrecht et al. | 363/25 |

OTHER PUBLICATIONS

IEEE Publication entitled "Four Quadrant Amplifier Based on the Flyback Topology" by Jim Walker: 1995; pp. 947–951.

Technical Specification entitled "UCC3750 Source Ringer Controller" by Unitrode Integrated Circuits Corporation 1996: 13 pages.

Primary Examiner—Shawn Riley
Assistant Examiner—Bao Q. Vu

[57] ABSTRACT

A four quadrant flyback converter, employable as part of a ringing signal generator, includes: (1) a transformer having first and second primary windings of opposite polarity and a secondary winding, (2) first and second switches that alternatively couple the first and second windings, respectively, to a source of DC input power and (3) a bidirectional switch coupling the secondary winding to an output of the converter, the first, second and bidirectional switches switchable to provide a continuous waveform at the output.

20 Claims, 3 Drawing Sheets

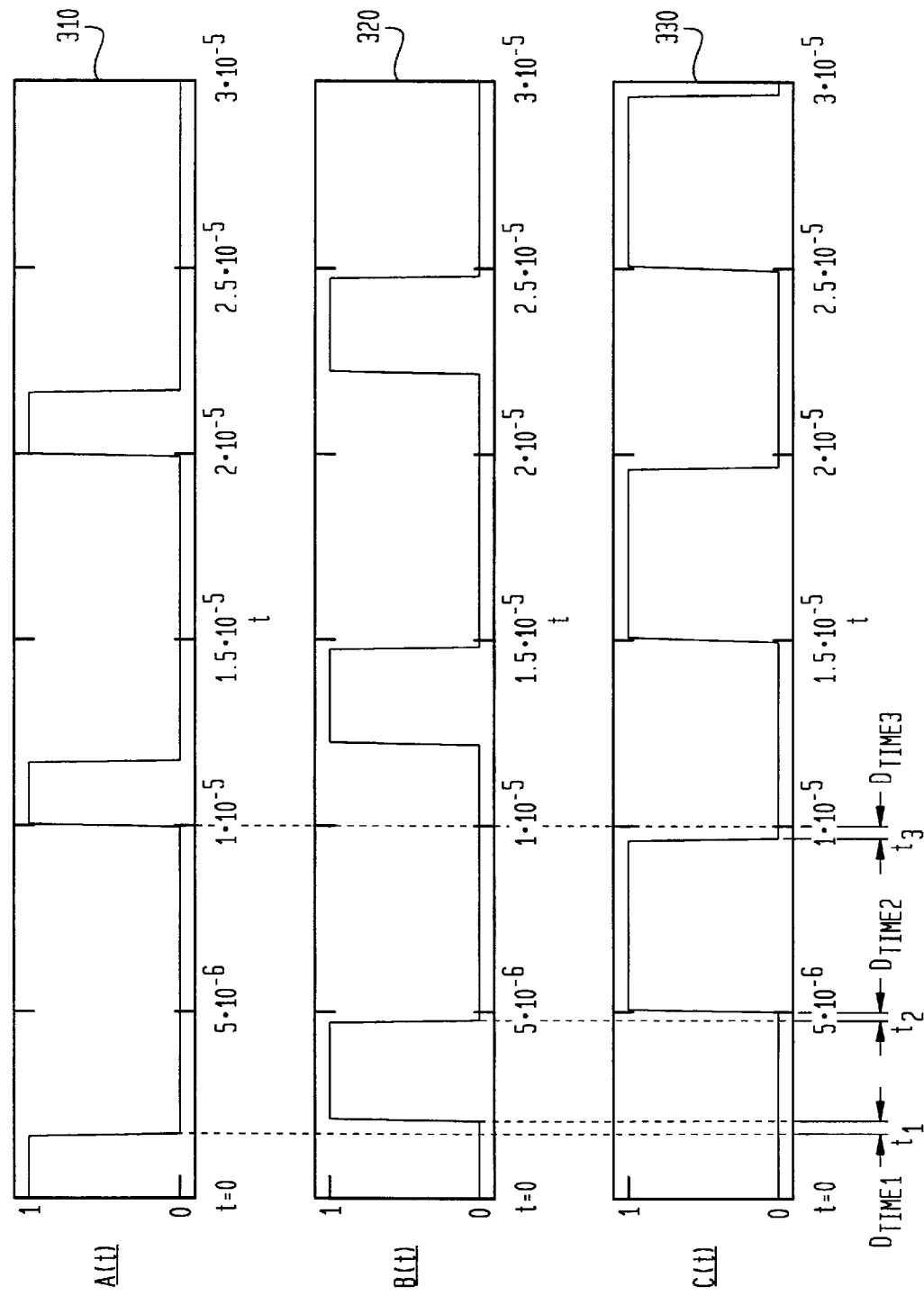

FOUR QUADRANT FLYBACK CONVERTER, METHOD OF OPERATION THEREOF AND POWER PLANT EMPLOYING THE SAME

TECHNICAL FIELD OF THE INVENTION

The present invention is directed, in general, to power conversion and, more specifically to a four quadrant flyback converter, a power plant containing the same and methods of operating the converter and the plant.

BACKGROUND OF THE INVENTION

Telecommunication devices typically alert customers to an incoming call by providing ringing signals, dial tones and busy signals. A centrally-located alternating current ("AC") ringing signal generator provides the necessary power to drive a ringer or tone source to create the desired signals. Today, rotary generators, magnetic generators or electronic oscillators usually serve as ringing signal generators.

Older telephone ringers include a series-parallel winding having an armature that drives a bell clapper. The ringing signal generator drives the winding. The winding requires a certain minimum drive current to provide sufficient magnetomotive force to drive the bell clapper. Because the winding has a nonlinear response to drive current, the current waveform is asymmetrical and tends to be peaked in one polarity direction. Also, due to reactive impedances in the winding, the drive current tends to be out of phase with the drive voltage. Moreover, operation of the winding requires bidirectional power. More recent telephone ringers are completely electronic and, depending upon their design, may or may not require drive currents to operate.

Since today's wire-based telecommunications infrastructure can include both older and newer telephone ringers, a central ringing signal generator must be capable of providing power to a variety of different telephone ringers. Some telephone ringers present an active load; others are passive. Active loads may be purely inductive, capacitive or resistive or may be some combination thereof. Further, a well-designed ringing signal generator must be able to accommodate phase distortions while maintaining a uniform voltage waveform to the telephone ringers.

Today's infrastructure also employs direct current ("DC") biasing to detect if the handset of a particular telecommunication device has been removed from its cradle (i.e., off-hook). The telephone ringer is normally coupled to the ringing signal generator (providing power at, for instance, 48 volts); when the handset is removed from its cradle, the telephone ringer is shorted. The flow of DC current through the ringer therefore indicates that the telephone is off-hook.

A prevalent telephone ringer topology currently in use is generally referred to as a "ferro" topology. The ferro topology is characterized by a converter having a transformer with a gap. A switching circuit on a primary side of the transformer alternately transmits opposite phases of the input power to provide power to the ringer. A positive temperature coefficient ("PCT") resistor provides a current-limiting function to protect the ringer from any overcurrent resulting from the saturation of the transformer due to the DC current. A primary limitation of the ferro topology is that it does not allow the recycling of power from the output to the input power source, resulting in inefficiencies in the converter. Additionally, the ferro topology requires a transformer that is large and heavy.

Another telephone ringer topology is described in U.S. Pat. No. 4,866,587, which issued on Sep. 12, 1989 to Wadlington and is entitled "Electronic Ringing Signal Generator." Wadlington discloses a converter topology that allows the recycling of the output power back to the input source (i.e., a bidirectional power flow). The foregoing reference is herein incorporated by reference. The converter of Wadlington, however, allows the recycling of power only as to one phase, either positive or negative, but not as to both phases. Another limitation of the converter of Wadlington is that the recycling of the power back to the source is not accomplished independently. Therefore, additional control circuitry is necessary to perform this function.

The Unitrode Corporation of Merrimack, New Hampshire, provides a four quadrant flyback converter topology in its Unitrode UCC3750 Source Ringer controller. This topology allows the recycling of power in both positive or negative voltage modes and also in both positive and negative current modes (so-called "four quadrant" operation). A major limitation of Unitrode's topology is that the recycling power process is not truly continuous. Thus, when the Unitrode controller is configuring its switches after sampling power, distortions appear in the controller's output waveform, indicating discontinuities.

Accordingly, what is needed in the art is a converter topology that permits bidirectional four-quadrant power flow and overcomes other limitations of the prior art.

SUMMARY OF THE INVENTION

To address the above-discussed deficiencies of the prior art, the present invention provides four quadrant flyback converters, methods of operating the converter and power plants employing the same. The converter includes: (1) a transformer having first and second primary windings of opposite polarity and a secondary winding, (2) first and second switches that alternatively couple the first and second windings, respectively, to a source of DC input power and (3) a bidirectional switch coupling the secondary winding to an output of the converter, the first, second and bidirectional switches switchable to provide a continuous waveform at the output.

The present invention therefore introduces the broad concept of providing four-quadrant power by alternatively coupling primary windings of opposite polarity to a DC source and communicating power bidirectionally between a secondary winding and the output of a converter.

In one embodiment of the present invention, the first and second switches are solid state switches and are driven at a substantially 50% joint duty cycle. The term "substantially" allows for some dead time between on times.

In one embodiment of the present invention, the bidirectional switch comprises a solid state switch and a rectifier. Other types of bidirectional switches fall within the broad scope of the present invention.

In one embodiment of the present invention, the converter further comprises an input capacitor selectively coupled across the first and second primary windings.

In one embodiment of the present invention, a duty cycle of the first, second and bidirectional switches is substantially 100%. This places the transformer in a continuous mode of operation, an advantageous mode when the converter is to be employed as part of a ringing signal generator.

In one embodiment of the present invention, the converter further comprises first and second diodes coupled in parallel with the first and second switches, respectively. The first and second diodes, which may be internal to the first and second switches, recycle power back to an input of the converter as necessary.

In one embodiment of the present invention, the converter further comprises at least one battery that provides the DC input power to the converter. Alternatively, the converter can receive its power from another type of DC source.

The foregoing has outlined rather broadly features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

FIG. 3 illustrates a plurality of drive waveforms that may be provided to controllable switches within the flyback converter of FIG. 2.

DETAILED DESCRIPTION

Figure 1:
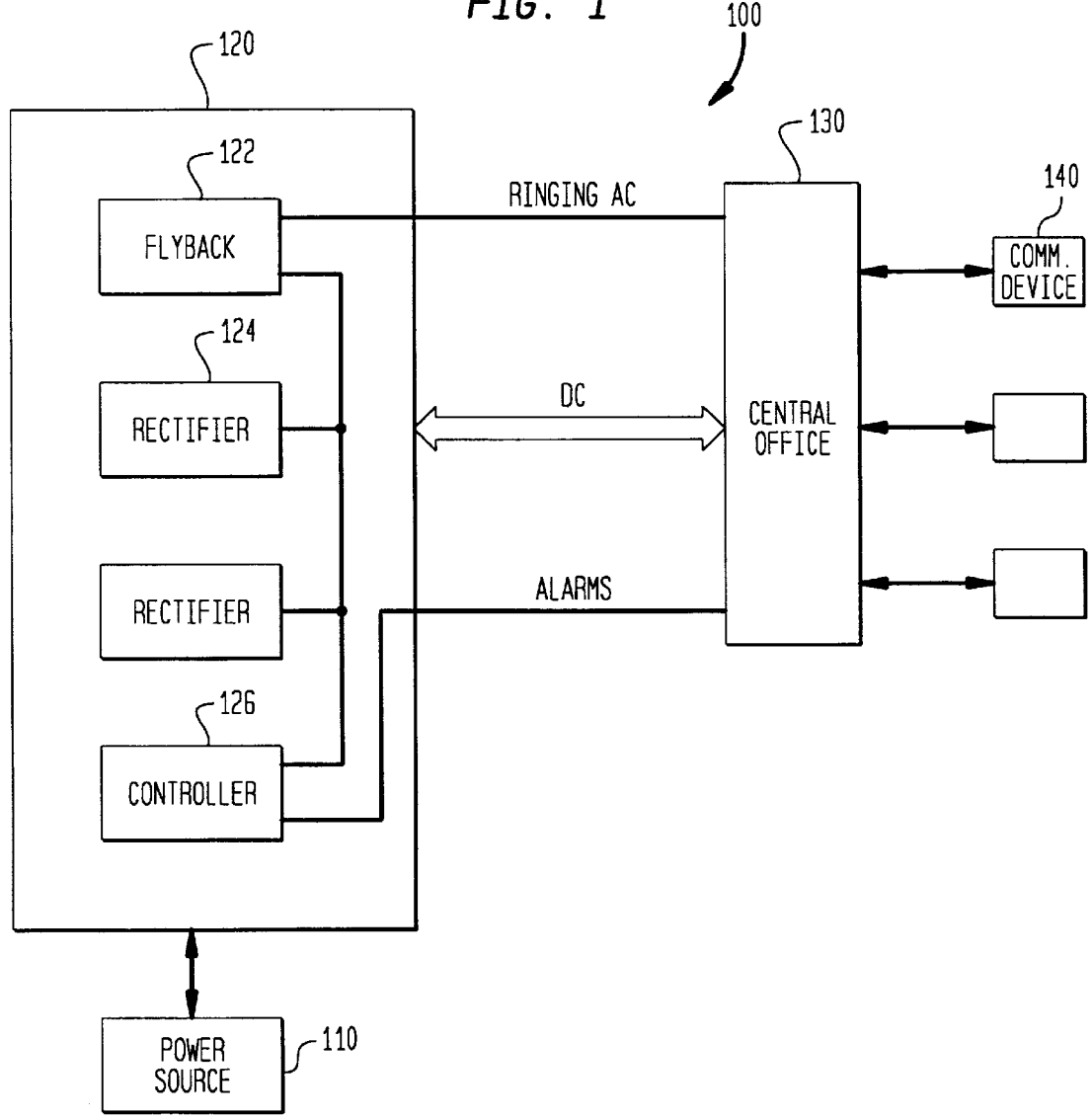
FIG. 1 illustrates a block diagram of a power plant that contains a flyback converter of the present invention.

Referring initially to FIG. 1, illustrated is a block diagram of a power plant 100 that contains a flyback converter 122 of the present invention. The power plant 100 includes a power source 110 that is coupled to an enclosure 120. The enclosure 120 houses a plurality of subassemblies including the flyback converter 122 and a plurality of rectifiers (one of which is designated 124). The flyback converter 122 and the rectifiers 124 are also coupled to a controller 126. The enclosure 120 is further coupled to a central office 130 having a plurality of communication devices (one of which is designated 140) coupled thereto.

The power source 110 (e.g., a battery or a bank of batteries) supplies power to the rectifiers 124, which condition the power supplied to a regulated DC voltage, typically 48V. The regulated DC output of the rectifiers 124 provides the input power to the flyback converter 122. The controller 126 monitors the system's voltages and alarms and provides this information to the central office 130.

The flyback converter 122 inverts the regulated DC input voltage to an AC output. The AC output of the flyback converter 122, along with the DC output of the rectifiers 124, is provided to the central office 130. The central office 130, in turn, uses the AC and DC power to operate the communication devices (e.g., a telephone instrument) 140. Typically, the AC power is used to operate the telephone ringer and the DC power is used to determine if the telephone is off-hook. The flyback converter 122 can recycle power from the load back to the power source 110.

Figure 2:
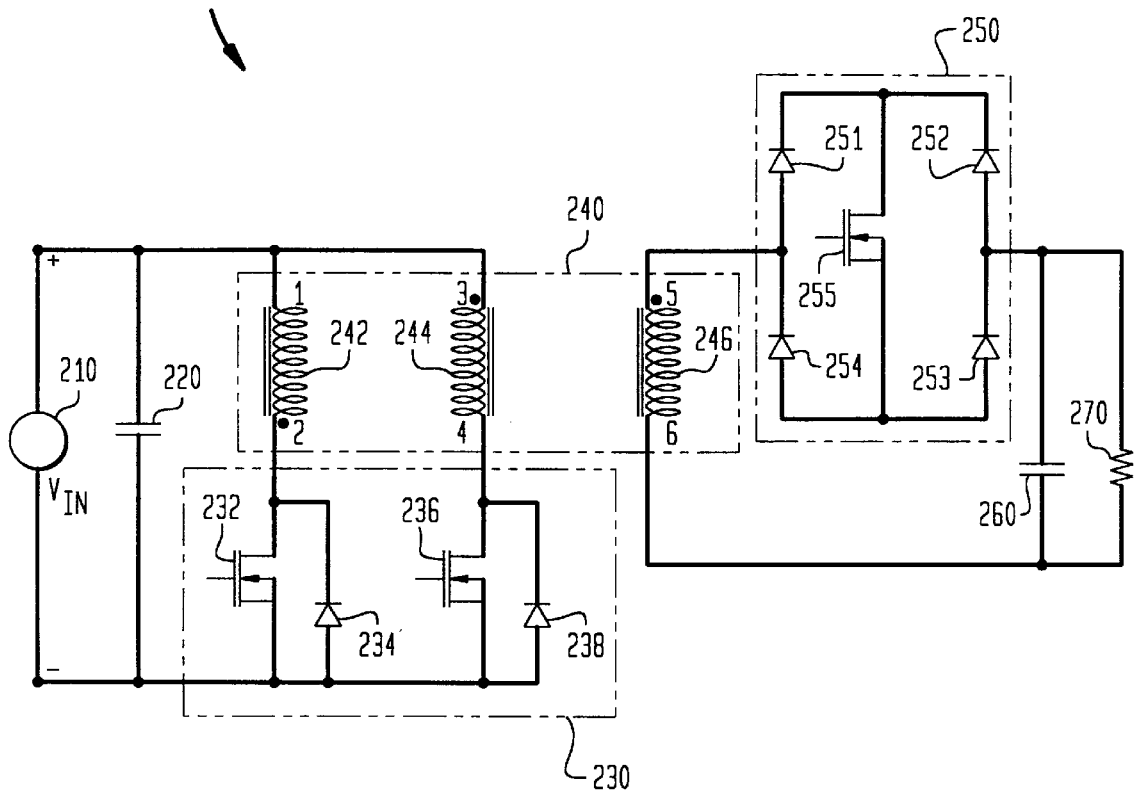
FIG. 2 illustrates a schematic diagram of an embodiment of a flyback converter constructed according to the principles of the present invention.

Turning now to FIG. 2, illustrated is a schematic diagram of an embodiment of a flyback converter 200 constructed according to the principles of the present invention. The flyback converter 200 includes a DC voltage source 210 coupled to a first and second primary winding 242, 244 of a transformer 240. An input filter capacitor 220 is coupled in parallel across the voltage source 210. The primary windings 242, 244 of the transformer 240 are coupled in series with a switching circuit 230. Also, a secondary winding 246 of the transformer 240 is coupled to a bidirectional switch 250 which is coupled to a filter capacitor 269 and a load (e.g., a resistive or capacitive load) 270.

The first primary winding 242 is coupled between pins 1 and 2, the second primary winding 244 is coupled between pins 3 and 4 and the secondary winding 246 is coupled between pins 5 and 6 of the transformer 240. The dots adjacent the pins 2, 3, 5 indicate the polarity of the voltages on the windings 242, 244, 246 of the transformer 240. For example, when the voltage on pin 2 of the first primary winding 242 is positive with respect to pin 1, the voltage on pin 5 on the secondary winding 246 is also positive with respect to pin 6. Again, the primary windings 242, 244 of transformer 240 are coupled in series with the switching circuit 230.

The switching circuit 230 includes a first and second switch [e.g., metal-oxide-semiconductor field effect transistors ("MOSFETs")] 232, 236 and a first and second diode 234, 238. The first diode 234 is coupled in parallel with the first switch 232 and the second diode 238 is coupled in parallel with the second switch 236. Also, the first primary winding 242 is coupled in series with the first switch 232 and first diode 234. Similarly, the second primary winding 244 is coupled in series with the second switch 236 and second diode 238. Those skilled in the art should recognize that the transformer 240 and switching circuit 230 are arranged in a "push-pull" configuration. The diodes 234, 238 provide a path for a current necessary for the leakage flux of the transformer 240 and to recycle power back to the input, when necessary. The integral diodes of the first and second switches 232, 236 may be employed in lieu of the first and second diodes 234, 238. Of course, other types of switching devices are well within the broad scope of the present invention.

The bidirectional switch 250 includes a switching device (e.g., a MOSFET) 255 and a third, fourth, fifth and sixth diode 251, 252, 253, 254. The drain of the switching device 255 is coupled to the n-terminals of third and fourth diodes 251, 252. The p-terminals of fifth and sixth diodes 253, 254 are similarly 3 coupled to the source of the switching device 255. To complete the rectifying circuit, the n-terminals of the fifth and sixth diodes 253, 254 are connected to the p-terminals of third and fourth diodes 251, 252, respectively. Again, the scope of the invention is not limited to the type of switching device employed therewith.

The voltage source 210 provides a DC voltage $V_{in}$ to transformer 240. The source of DC voltage $V_{in}$ may be a rectifier as illustrated in FIG. 1. If the load 270 is reactive, the output current will lag the output voltage. When the flyback converter 200 is in an inverter mode of operation (i.e., the instantaneous power flow is from the DC input to the AC output) and the first switch 232 is conducting (i.e., on), a current flows through the first primary winding 242 and energy is stored in the magnetizing inductance of the transformer 240. When the first switch 232 is conducting and the second switch 236 and the switching device 255 are not conducting (i.e., off), the current does not flow in the secondary winding 246 because the third and fifth diodes 251, 253 are reverse-biased (pin 6 is positive with respect to pin 5). When the first switch 232 is turned off, the current flow in the first primary winding 242 terminates. The current and voltage transfer functions when the first switch 232 is conducting are represented by the following equations:

$$\Delta I_{tp} = (V_{in} 19\ D_a)/(L \cdot F_s)$$

where $\Delta I_{tp}$ is the change of the primary current, $V_{in}$ is the input voltage, $D_a$ is the duty cycle of the first switch 232, L is the primary inductance and $F_s$ is the switching frequency; and $$\Delta V_o = (-V_o \cdot D_a)/(R_{load} \cdot C \cdot F_s)$$

where $\Delta V_o$ is the change in the output voltage due to the discharge of the filter capacitor 260 during this time, $V_o$ is the output voltage, $R_{load}$ is the resistance value of the load 270 and C is the filter capacitor 260.

Similarly, when the second switch 236 is conducting and the first switch 232 and the switching device are not conducting, a current flows in the second primary winding 244 and energy is stored in the magnetizing inductance of the transformer 240. A current does not flow in the secondary winding 246 because now the fourth and sixth diodes 252, 254 are reverse-biased (pin 5 is positive with respect to pin 6). The current flow terminates in the second primary winding 244 when the second switch 236 is turned off. The current and voltage transfer functions when the second switch 236 is conducting are represented by the following equations:

$$\Delta I_{tp} = (-V_{in} \cdot D_b)/(L \cdot F_s)$$

where $D_b$ is the duty cycle of the second switch 236; and $$\Delta V_o = (-V_o \cdot D_b)/(R_{load} \cdot C \cdot F_s).$$

When the switching device 255 is turned on, the energy stored in the magnetizing inductance of the transformer 240 (previously stored when the first and second switches 232, 236 were conducting) is transferred to the secondary winding 246. For instance, the energy stored when the first switch 232 was conducting is thereafter transferred to the load 270 when the switching device 255 is turned on. To facilitate the transfer, the fourth and sixth diodes 252, 254 are forward-biased (pin 6 is positive with respect to pin 5) and a current path is provided through the fourth diode 252, the switching device 255 and the sixth diode 254. Similarly, the energy stored when the second switch 236 was conducting is thereafter transferred to the load 270 when the switching device 255 is turned on. To facilitate the transfer, the third and fifth diodes 251, 253 become forward-biased (pin 5 is positive with respect to pin 6) and a current path is provided through the third diode 251, the switching device 255 and the fifth diode 253. Thus, the current flow is provided in both directions thereby demonstrating two quadrant operation. The current and voltage transfer functions when the switching device 255 is conducting are represented by the following equations:

$$\Delta I_{tp} = [(-V_o \cdot D_c)/(L \cdot F_s)] \cdot [N_p/N_s];$$

$$I_{ts} = I_{tp} \cdot (N_p/N_s);$$

where $D_c$ is the duty cycle of the switching device 255, $N_p$ is the number of turns in the primary windings 242, 244, $N_s$ is the number of turns in the secondary winding 246, $I_{tp}$ is the stored current in the primary and $I_{ts}$ is the equivalent current in the secondary; and $$\Delta V_o = [(-V_o \cdot D_c)/(R_{load} \cdot C \cdot F_s)] + [((I_{tp} \cdot D_c)/(C \cdot F_s)) \cdot (N_p/N_s)].$$

When the flyback converter 200 is at steady state operation, all the changes have to add up to zero, therefore:

$$\Delta I_{tp} = 0 \text{ and } \Delta V_o = 0.$$

Combining the foregoing equations and solving for $V_o$ and $I_{tp}$, yields the following equations:

$$V_o = [(D_a - D_b)/D_c] \cdot [N_s/N_p] \cdot V_{in}; \text{ and}$$

$$I_{tp} = (I_o/D_c) \cdot (N_s/N_p)$$

where $I_o = V_o/R_{load}$.

When the flyback converter 200 is operating in a rectifier mode of operation (i.e, the instantaneous power flow is from the AC output to the DC input), energy is transferred from the output back to the input. In this mode of operation, a current flows through the secondary winding 246 when the switching device 255 is turned on and a current path is provided through the fourth and sixth diodes 252, 254 (or the third and fifth diodes 251, 253 depending on the polarity relationships) to the input of the flyback converter 200. If both the first and second switch 232, 236 are not conducting, energy is stored in the magnetizing inductance of the transformer 240. This energy is transferred to the input voltage source 210 when the first or second switch 232, 236 is turned on and the energy in the magnetizing inductance is transferred to the first or second primary windings 242, 244, respectively. The current and voltage transfer functions are analogous to the relationships described above.

The transformer 240 provides several functions including electrical isolation between the voltage source 210 and the output load 270 and energy storage and transfer during various operating cycles of the flyback converter 200.

Turning now to FIG. 3, illustrated is a plurality of drive waveforms that may be provided to controllable switches within the flyback converter 200 of FIG. 2. The drive waveforms consist of three timing diagrams. With continuing reference to FIG. 2, the timing diagrams will hereinafter be described. A first switch timing diagram 310 illustrates a series of pulses employed to transition the first switch 232 on and off. Similarly, a second switch timing diagram 320 and a switching device timing diagram 330 illustrates a series of pulses employed to transition the second switch 236 and switching device 255, respectively, on and off. A pulse-width modulation ("PWM") controller (not shown) provides the pulses having a period, T. It should be noted that the first, second and third time periods t1, t2 and t3 are drawn for clarity and ease of explanation and are not necessarily drawn to scale.

In the embodiment of the present invention as described with respect to FIG. 2, the first switch 232 is turned on and thereafter the second switch 236 and switching device 255 are transitioned on in succession. The sequence is continuously repeated during an operating cycle of the flyback converter 200. Of course, other operational sequences are equally applicable.

At a time t=0, the first switch 232 is conducting and continues to operate as a closed switch until the time $t=t_1$, at which time the first switch 232 is transitioned off. When the first switch 232 is conducting and the flyback converter 200 is operating as an inverter, the current increases through the first primary winding 242. At this time, the switching device 255 is not conducting and the third and fifth diodes 251, 253 are reverse-biased and not conducting. The energy from the current flowing through the first primary winding 242 is not transferred to the secondary winding 246, but stored in the magnetizing inductance of transformer 240. If the flyback converter 200 is in the rectifier mode of operation, the energy stored in the transformer 240 is transferred to the first primary winding 242 and current flows to the input voltage source 210 when the first switch 232 is conducting.

After a dead-time $D_{time1}$, the second switch 236 is turned on at a time $t=t_1+D_{time1}$. The second switch 236 operates as a closed switch until it is transitioned off at a time $t=t_2$. If the flyback converter 200 is operating in the inverter mode, the energy stored from the current flow through the second primary winding 244 is not transferred to the secondary winding 246 because the fourth and sixth diodes 252, 254 are reverse-biased and do not conduct. The energy is combined with the energy previously stored in the first primary winding 242 in the magnetizing inductance of transformer 240. The energy previously stored in the transformer 240 when the first switch 232 was conducting is recycled during this period. The quantity of energy dissipated depends on the duty cycles of the first and second switches 232, 236. Again, if the flyback converter 200 is in the rectifier mode of operation, the energy stored in the transformer 240 is transferred to the second primary winding 244 and current flows to the input voltage source 210 when the second switch 236 is conducting.

The switching device 255 is turned on at a time $t=t_2+D_{time2}$ and operates as a closed switch until it is transitioned off at a time $t=t_3$. While the switching device 255 is conducting (and assuming that the flyback converter 200 is acting as an inverter), the energy stored in transformer 240 is transferred to the secondary winding 246. When the flyback converter 200 is operating as a rectifier, a current flows through the secondary winding 246 and the energy is stored in the magnetizing inductance of the transformer 240 and ultimately transferred to the input.

The sequence is continuously repeated for the duration of the operation of the flyback converter 200. The duty cycles of the switches 232, 236, 255 combine to add up to one period minus the dead-times. For the exemplary pulses shown in the switching device timing diagram 330, the duty cycle is approximately 50%. With the duty cycle of the switching device 255 set at about 0.5T, the following equations represent the operation of the flyback converter 200:

$$V_o=[(4 \cdot D_a)-1] \cdot [N_s/N_p] \cdot V_{in}; \text{ and}$$

$$I_{tp}=2 \cdot I_o \cdot (N_s/N_p)$$

While the duty cycles of the first and second switch 232, 236 can be varied to change the voltage gain, the sum of the duty cycles should add up to about 0.5T. This complementary switching arrangement allows for a simplified control scheme for operation of the flyback converter 200. With this control sequence, the direction of the power flow is not important. One switch is always on and power can flow therethrough or through the switches partner diodes in either direction. During the dead-times (when switches are not conducting), one of the freewheeling diodes conducts the current depending on the remaining flux in the transformer 240.

Since the power flow is bidirectional and there is no dead-time period long enough to idle the transformer 240, the transformer 240 is in continuous mode of operation at all times. The continuous mode of operation results in an output waveform that is continuous with minimal distortions.

Additionally, if a current mode control is employed, the current signal in the first switch 232 can be used to control the flyback converter 200. With the duty cycle of the switching device 255 set at about 0.5T and the duty cycle of the first switch 232 predetermined, the duty cycle of the second switch 236 is automatically determined. Therefore, triggering can be initiated when the first switch 232 is turned off and reset can be executed when the first switch 232 is turned on.

While the preceding FIGUREs illustrate exemplary embodiments of a power plant, flyback converter and methods of operation therefor, other circuits (including variations of the foregoing circuits) and methods of operation therefor are well within the broad scope of the present invention. For a better understanding of power electronics including flyback converter topologies see *Principles of Power Electronics*, by J. Kassakian, M. Schlecht, Addison-Wesley Publishing Company (1991). The aforementioned reference is herein incorporated by reference.

Although the present invention has been described in detail, those skilled in the art should understand that they can make various changes, substitutions and alterations herein without departing from the spirit and scope of the invention in its broadest form.

What is claimed is:

1. A four quadrant flyback converter, comprising:
    a transformer having first and second primary windings of opposite polarity and a secondary winding;
    first and second switches that alternatively couple said first and second primary windings, respectively, to a source of DC input power; and
    a bidirectional switch coupling said secondary winding to an output of said converter when said first and second primary windings are not coupled to said source of DC input power, said first, second and bidirectional switches switchable to allow said transformer to function in a continuous mode of operation.

2. The converter as recited in claim 1 wherein said first and second switches are solid state switches and are driven at a substantially 50% joint duty cycle.

3. The converter as recited in claim 1 wherein said bidirectional switch comprises a solid state switch and a rectifier.

4. The converter as recited in claim 1 further comprising an input capacitor selectively coupled across said first and second primary windings.

5. The converter as recited in claim 1 wherein a duty cycle of said first, second and bidirectional switches is jointly substantially 100%.

6. The converter as recited in claim 1 further comprising first and second diodes coupled in parallel with said first and second switches, respectively.

7. The converter as recited in claim 1 further comprising at least one battery that provides said DC input power to said converter.

8. A method of producing DC output power from a flyback converter under conditions of positive and negative voltage and positive and negative current, comprising the steps of:
    energizing first and second primary windings of opposite polarity of a transformer by alternatively coupling said first and second primary windings to a source of DC input power; and
    communicating power between a secondary winding of said transformer and an output of said converter with a bidirectional switch when said first and second primary windings are not coupled to said source of DC input power, said method adapted to allow said transformer to function in a continuous mode of operation.

9. The method as recited in claim 8 wherein said step of energizing is performed by first and second switches, said first and second switches being driven at a substantially 50% joint duty cycle.

10. The method as recited in claim 8 wherein said bidirectional switch comprises a solid state switch and a rectifier.

11. The method as recited in claim 8 further comprising the step of selectively coupling an input capacitor across said first and second primary windings.

12. The method as recited in claim 9 wherein a duty cycle of said first, second and bidirectional switches is jointly substantially 100%.

13. The method as recited in claim 9 further comprising the step of communicating power though first and second diodes coupled in parallel with said first and second switches, respectively.

14. The method as recited in claim 8 further comprising at least one battery that provides said DC input power to said converter.

15. A power plant, comprising:

a battery;

a four quadrant flyback converter coupled to said battery, including:

a transformer having first and second primary windings of opposite polarity and a secondary winding;

first and second switches coupled between said first and second primary windings, respectively, and said battery; and a bidirectional switch coupled between said secondary winding and an output of said converter; and a converter controller, including:

a controller, coupled to control inputs of said first, second and bidirectional switches, alternatively to couple said first and second primary windings to said battery and to couple said secondary winding to said output when said first and second primary windings are not coupled to said battery, said controller controlling said first, second and bidirectional switches to allow said transformer to function in a continuous mode of operation.

16. The power plant as recited in claim 15 wherein said controller drives said first and second switches at a substantially 50% joint duty cycle.

17. The power plant as recited in claim 15 wherein said bidirectional switch comprises a solid state switch and a rectifier.

18. The power plant as recited in claim 15 wherein said converter further includes an input capacitor selectively coupled across said first and second primary windings.

19. The power plant as recited in claim 15 wherein said controller drives said first, second and bidirectional switches jointly at a duty cycle of substantially 100%.

20. The power plant as recited in claim 15 wherein said converter further includes first and second diodes coupled in parallel with said first and second switches, respectively.

* * * * *